United States Patent
Sridhara et al.

(10) Patent No.: US 9,351,119 B2
(45) Date of Patent: *May 24, 2016

(54) METHOD AND APPARATUS FOR DETECTING LOCATION CHANGES AND MONITORING ASSISTANCE DATA VIA SCANNING

(71) Applicant: QUALCOMM Incorporated, San Diego, CA (US)

(72) Inventors: Vinay Sridhara, Sunnyvale, CA (US); Faraz Mohammad Mirzaei, Santa Clara, CA (US); Saumitra Mohan Das, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/964,380

(22) Filed: Dec. 9, 2015

(65) Prior Publication Data

US 2016/0100291 A1    Apr. 7, 2016

Related U.S. Application Data

(63) Continuation of application No. 14/054,602, filed on Oct. 15, 2013, now Pat. No. 9,253,596.

(51) Int. Cl.
*H04W 4/02* (2009.01)
*G01S 5/02* (2010.01)

(52) U.S. Cl.
CPC ............ *H04W 4/023* (2013.01); *G01S 5/0236* (2013.01); *G01S 5/0252* (2013.01)

(58) Field of Classification Search
CPC ....... G01S 5/02; G01S 5/0252; G01S 5/0294; H04W 4/023; H04W 64/00

USPC ............... 455/456.1, 421, 420, 552.1, 404.1, 455/456.2, 456.5–456.6, 435.2–453; 370/328–332, 338

See application file for complete search history.

(56) References Cited

U.S. PATENT DOCUMENTS

| 8,185,129 | B2* | 5/2012 | Alizadeh-Shabdiz | .... G01S 5/02 455/456.1 |
| 2006/0142004 | A1* | 6/2006 | He | .......................... H04W 48/16 455/434 |

(Continued)

FOREIGN PATENT DOCUMENTS

| WO | WO-2008006077 A2 | 1/2008 |
| WO | WO-2011058228 A1 | 5/2011 |

OTHER PUBLICATIONS

CISCO, "Wi-Fi Location-Based Services 4.1 Design Guide," Text Part No. OL-11612-01, May 20, 2008, 206 pages.*

(Continued)

*Primary Examiner* — Babar Sarwar
(74) *Attorney, Agent, or Firm* — Berkeley Law & Technology Group LLP

(57) ABSTRACT

Example methods, apparatuses, or articles of manufacture are disclosed herein that may be utilized, in whole or in part, to facilitate or support one or more operations or techniques for detecting location changes and monitoring assistance data via scanning for use in or with a mobile device. Briefly, in accordance with at least one implementation, a method may include obtaining, at a mobile device, a rough estimate of a location of the mobile device; identifying a plurality of transmitters within a signal acquisition range of the roughly estimated location; transmitting probe requests addressed to at least some of the transmitters; and selectively initiating a passive scan at a receiver of the mobile device if a number of responses to the probe requests received from the transmitters is less than a threshold number.

30 Claims, 6 Drawing Sheets

(56) References Cited

U.S. PATENT DOCUMENTS

| | | | |
|---|---|---|---|
| 2007/0202888 A1* | 8/2007 | Brachet | G01S 5/02 455/456.1 |
| 2009/0054096 A1* | 2/2009 | Single | H04W 52/325 455/509 |
| 2009/0103503 A1* | 4/2009 | Chhabra | H04W 48/20 370/338 |
| 2010/0103844 A1* | 4/2010 | Kim | H04W 48/16 370/254 |
| 2012/0076045 A1* | 3/2012 | Pease | H04W 72/0453 370/254 |
| 2012/0300761 A1* | 11/2012 | Vasko | H04W 48/16 370/338 |
| 2012/0327922 A1* | 12/2012 | Takahashi | G01S 5/0263 370/338 |
| 2013/0260797 A1* | 10/2013 | Jones | H04W 4/02 455/456.3 |
| 2015/0105098 A1 | 4/2015 | Sridhara et al. | |

OTHER PUBLICATIONS

International Search Report and Written Opinion—PCT/US2014/060542—ISA/EPO—Feb. 9, 2015.

Partial International Search Report—PCT/US2014/060542—ISA/EPO—Dec. 17, 2015.

* cited by examiner

METHOD AND APPARATUS FOR DETECTING LOCATION CHANGES AND MONITORING ASSISTANCE DATA VIA SCANNING

CROSS-REFERENCE TO RELATED APPLICATIONS

This Patent Application is a continuation of U.S. patent application Ser. No. 14/054,602, entitled "METHOD AND APPARATUS FOR DETECTING LOCATION CHANGES AND MONITORING ASSISTANCE DATA VIA SCANNING", filed Oct. 15 2013, assigned to the assignee hereof, and expressly incorporated herein by reference in its entirety.

BACKGROUND

1. Field

The present disclosure relates generally to position or location estimations of mobile communication devices and, more particularly, to detecting location changes and monitoring assistance data via scanning for use in or with mobile communication devices.

2. Information

Mobile communication devices, such as, for example, cellular telephones, portable navigation units, laptop computers, personal digital assistants, or the like are becoming more common every day. Certain mobile communication devices, such as, for example, location-aware cellular telephones, smart telephones, or the like may assist users in estimating their geographic locations by providing positioning assistance data obtained or gathered from various systems. For example, in an outdoor environment, certain mobile communication devices may obtain an estimate of their geographic location or so-called "position fix" by acquiring wireless signals from a satellite positioning system (SPS), such as the global positioning system (GPS) or other like Global Navigation Satellite Systems (GNSS), cellular base station, location beacon, etc. via a cellular telephone or other wireless communications network. In some instances, acquired wireless signals may be processed by or at a mobile communication device, and its location may be estimated using known techniques, such as, for example, Advanced Forward Link Trilateration (AFLT), base station identification, or the like.

In an indoor environment, at times, certain mobile communication devices may be unable to reliably receive or acquire satellite or like wireless signals to facilitate or support one or more position estimation techniques. For example, signals from an SPS or other wireless transmitters may be attenuated or otherwise affected in some manner (e.g., insufficient, weak, fragmentary, blocked, etc.), which may at least partially preclude their use for position estimations. As such, in an indoor environment, different techniques may be employed to enable navigation or location services. For example, a mobile communication device may obtain a position fix by measuring ranges to three or more terrestrial wireless access points positioned at known locations. Ranges may be measured, for example, by obtaining a Media Access Control identifier (MAC ID) address from wireless signals received from suitable access points and measuring one or more characteristics of received signals, such as signal strength, round trip delay, or the like.

At times, an indoor location of a mobile communication device may be estimated via radio heat map signature matching, for example, in which current or live characteristics or signatures of wireless signals received at the device are compared with expected or previously measured signal characteristics stored as heat map values in a database. In some instances, however, such as in larger indoor or like environments with multiple floors, access points, or feasible routes, for example, a radio heat map may be quite voluminous or comprehensive so as to tax available bandwidth in wireless communication links, memory of a mobile communication device, or the like. In addition, downloading or otherwise accessing voluminous or comprehensive radio heat maps may, for example, lead to longer latencies or processing times with respect to position operations. This may also increase power consumption of certain mobile communication devices, such as mobile devices with limited power resources (e.g., battery-operated, etc.), for example, thus, affecting operating lifetime or overall utility of such devices.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
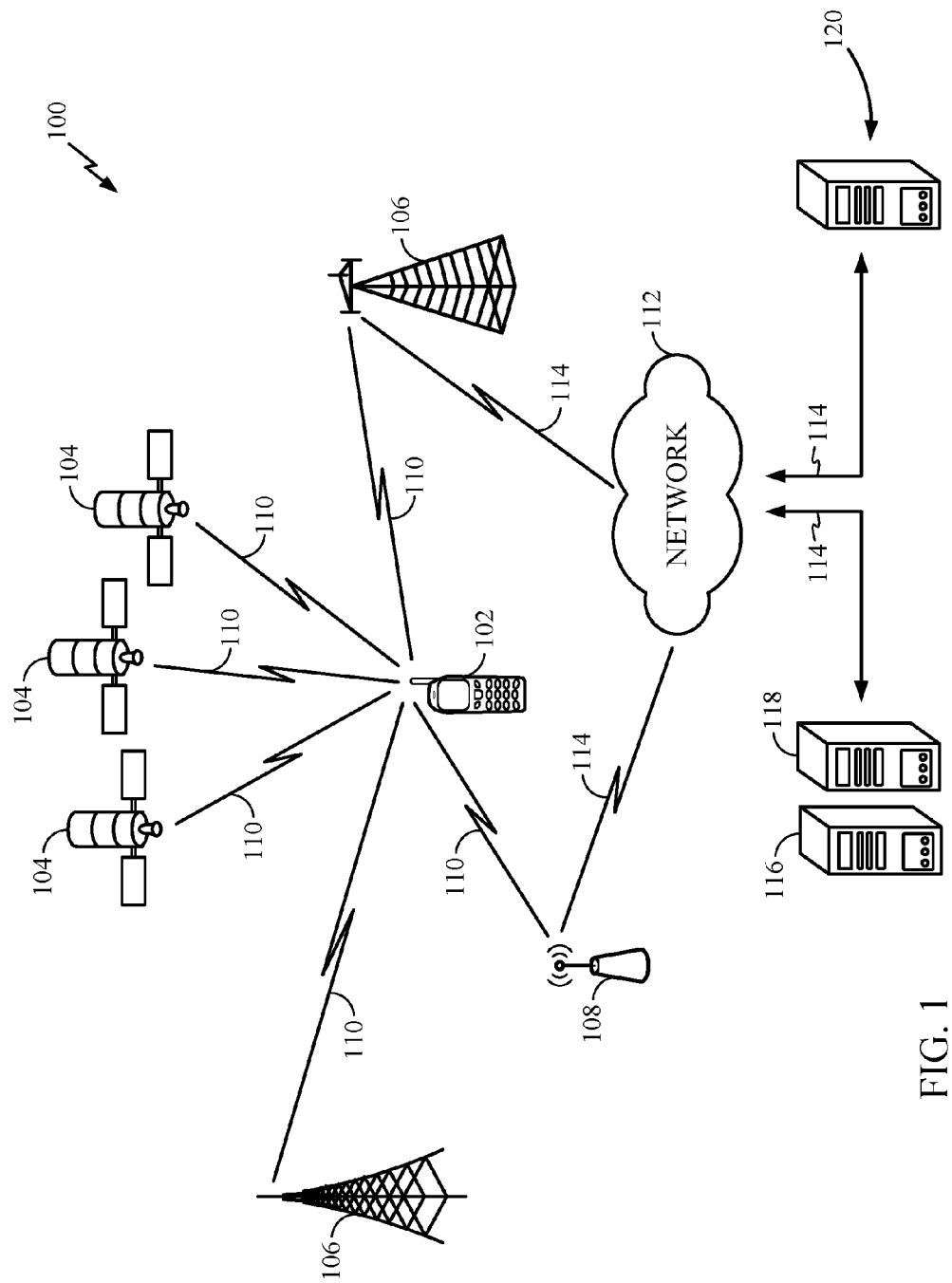
FIG. 1 is a schematic diagram illustrating features associated with an implementation of an example operating environment.

Example implementations relate to techniques for detecting location changes and monitoring assistance data via scanning. In one implementation, a method may comprise obtaining, at a mobile device, a rough estimate of a location of the mobile device; identifying a plurality of transmitters within a signal acquisition range of the roughly estimated location; transmitting probe requests addressed to at least some of the transmitters; and selectively initiating a passive scan at a receiver of the mobile device if a number of responses to the probe requests received from the transmitters is less than a threshold number.

In another implementation, an apparatus may comprise a mobile device comprising a wireless transceiver to communicate with a wireless network; and one or more processors programmed with instructions to obtain a rough estimate of a location of the mobile device; identify a plurality of transmitters within a signal acquisition range of the roughly estimated location; transmit probe requests addressed to at least some of the transmitters; and selectively initiate a passive scan at a receiver of the mobile device if a number of responses to the probe requests received from the transmitters is less than a threshold number.

In yet another implementation, an apparatus may comprise means for obtaining, at a mobile device, a rough estimate of a location of the mobile device; means for identifying a plurality of transmitters within a signal acquisition range of the roughly estimated location; means for transmitting probe requests addressed to at least some of the transmitters; and means for selectively initiating a passive scan at a receiver of the mobile device if a number of responses to the probe requests received from the transmitters is less than a threshold number.

In yet another implementation, an article may comprise a non-transitory storage medium having instructions stored thereon executable by a special purpose computing platform to obtain, at a mobile device, a rough estimate of a location of the mobile device; identify a plurality of transmitters within a signal acquisition range of the roughly estimated location; transmit probe requests addressed to at least some of the transmitters; and selectively initiate a passive scan at a receiver of the mobile device if a number of responses to the probe requests received from the transmitters is less than a threshold number. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate or support one or more operations or techniques for detecting location changes and monitoring assistance data via scanning for use in or with a mobile communication device. As used herein, "mobile device," "mobile communication device," "wireless device," "location-aware mobile device," or the plural form of such terms may be used interchangeably and may refer to any kind of special purpose computing platform or apparatus that may from time to time have a position or location that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be called simply mobile devices, may include, for example, cellular telephones, smart telephones, personal digital assistants (PDAs), laptop computers, personal entertainment systems, tablet personal computers (PC), personal audio or video devices, personal navigation devices, or the like. It should be appreciated, however, that these are merely examples of mobile devices that may be used, at least in part, to implement one or more operations or techniques for detecting location changes and monitoring assistance data via scanning, and that claimed subject matter is not limited in this regard. It should also be noted that the terms "position" and "location" may be used interchangeably herein.

In this context, a location context identifier (LCI) may refer to a locally defined geographic area that may be used to store or access geographically linked information associated with that area, such as, for example, a building, a particular floor of a building, a certain portion or wing of a building, or like areas that may or may not be mapped according to a global coordinate system. As will be seen, one or more LCIs may be selectively provided to a mobile device as part of positioning assistance data and may be used, at least in part, to obtain or improve an indoor position fix of the mobile device, such as in connection with one or more radio heat maps, for example. Depending on an implementation, one or more LCIs may, for example, be provided or made available to a mobile device by an indoor navigation system, suitable server, or the like. For example, one or more LCIs may be stored at a location server and may be accessible by a mobile device via a selection of a Uniform Resource Locator (URL), just to illustrate one possible implementation.

At times, to detect or discover all or most wireless transmitters located within an acquisition range, such as to acquire positioning or like signals, for example, it may be useful for a mobile device to perform one or more Wi-Fi scans of an indoor or like area of interest. For example, at times, a mobile device may perform an active scan, a passive scan, or any combination thereof. As will be seen, a mobile device may implement an active scan of an area via transmitting one or more probe requests, such as in the form of one or more unicast packets, for example, to one or more known wireless transmitters and receiving one or more probe responses. For example, a mobile device may transmit a request to send (RTS) to a number of known wireless transmitters within a given area, and wireless transmitters may respond with a clear to send (CTS) probe response. A probe response may include, for example, a basic service set identification (BSSID) of a probed wireless transmitter, service set identification (SSID) of an associated Wi-Fi-type wireless communications network, or other information that may be used, at least in part, for localization.

An active scan does not necessarily block data traffic and may take less time to complete (e.g., 10 ms per wireless transmitter, etc.). Here, one or more active measurements with respect to probed wireless transmitters may, for example, be obtained or collected. For example, in some instances, such as if a known wireless transmitter emits a relatively consistent location-dependent characteristic or exhibits a relatively consistent processing delay, respective RSSI or RTT may, for example, be obtained or collected. Thus, the terms "active scan" and "active measurements" may be used interchangeably herein. As will be described in greater detail below, one or more active scans or measurements may be used, at least in part, for more effective or efficient indoor positioning. An RTS may typically be sent to wireless transmitters with known MAC addresses and frequency channels, but, at times, however, frequency channels may be unknown. Also, since there may be a relatively large number of in-range wireless transmitters, in some instances, overhead of an active scan may be quite high.

Thus, in some instances, such as to obtain frequency channels of in-range wireless transmitters, for example, a passive scan may be implemented or performed. Typically, a passive scan may involve "listening" for periodic beacon-type wireless signals communicated by one or more wireless transmitters within an acquisition range of the mobile device. Here, knowledge of MAC addresses of scanned wireless transmitters may not be required or useful, for example, and a passive scan may detect a wireless transmitter with a hidden service set identification (SSID). As such, a passive scan may, for example, provide or yield a list of MAC addresses, corresponding operational channels, etc. of all or most wireless transmitters located within an acquisition range of a mobile device. A passive scan, however, may take a relatively longer time to complete (e.g., 3 sec., etc.), for example, and may preclude a mobile device from transmitting or receiving data traffic during the scan. As such, at times, a passive scan may be more energy-consuming, power or bandwidth-expensive, etc., such as in relation to an active scan, for example. Of course, these are merely examples relating to passive or active scans, and claimed subject matter is not so limited.

As was indicated, in some instances, positioning assistance data may comprise, for example, an electronic digital map of an indoor or like area of interest identifiable via one or more LCIs. An electronic digital map may include, for example, indoor features of an area, such as doors, hallways, staircases, elevators, walls, etc., as well as points of interest, such as restrooms, stores, entry ways, pay phones, or the like. By obtaining a digital map of an indoor or like area of interest, such as identified via one or more relevant LCIs, for example, a mobile device may be capable of overlaying its current location over the displayed map of the area so as to provide an associated user with additional context, frame of reference, or the like. Of course, these are merely examples relating to digital maps or LCIs, and claimed subject matter is not so limited.

At times, positioning assistance data may include, for example, a radio heat map constructed for an indoor or like environment. A radio heat map may comprise, for example, radio heat map values representing observed characteristics of wireless signals or so-called signal "signatures" indicative of expected signal strength (e.g., RSSI, etc.), round-trip delay times (e.g., RTT, etc.), or like characteristics at particular locations in an indoor or like area of interest. A radio heat map may be provided or made available by a suitable server (e.g., location server, positioning assistance server, etc.), such as for a download via one or more wireless communications links, for example. A downloaded radio heat map may be stored or "cached" in a local memory of a mobile device, for example, to facilitate or support one or more signal signature matching operations, as was indicated. A radio heat map may facilitate or support measurements of ranges to one or more wireless transmitters, such as one or more access points, for example, positioned at known locations within an indoor or like area of interest. Thus, for a known wireless transmitter, a radio heat map may, for example, associate a particular location with a heat map value representative of an expected signal signature (e.g., RSSI, RTT, etc.) at the location. As such, heat map values associated with one or more known wireless transmitters may, for example, enable a mobile device to correlate observed signal signatures with locations within an indoor or like area of interest.

As alluded to previously, positioning assistance data (e.g., locations of wireless transmitters, radio heat maps, digital maps for display, routing graphs, etc.) for a relatively large or multi-story indoor or like environment may be quite voluminous or comprehensive, which may lead to increased processing times, affect power consumption of a mobile device, or the like. For example, at times, there may be uncertainty as to a particular floor (e.g., of a shopping mall, etc.) on which a mobile device is located. To resolve this uncertainty, a mobile device may download multiple radio heat maps, such as for each candidate floor, for example. Again, this may be time-consuming, waste network bandwidth, memory or power of a mobile device, or the like. In addition, at times, due, at least in part, to limited memory resources, coverage or metadata transfer plan, etc., a mobile device may be unable to reliably receive or download a comprehensive radio heat map into a local memory, for example. As such, at times, indoor positioning or navigation capabilities of certain mobile devices may, for example, be less useful or possibly faulty.

Thus, in some instances, such as in relatively large or multi-story indoor or like environments, for example, it may be useful to resolve or determine a general area (e.g., a particular floor, wing of a building, etc.) of where a mobile device may be located. A mobile device may then be provided with smaller, localized positioning assistance data for use in that particular area (e.g., a portion of a heat map, locations of wireless transmitters located on a particular floor, a digital map identified via relevant LCIs, etc.). At times, a mobile device may, for example, resolve its location as being in a particular portion of an interior area, particular floor of a building, etc. by acquiring signals from one or more wireless transmitters positioned at known locations. For example, a mobile device may acquire a MAC address or other information modulating a signal transmitted by a wireless transmitter (e.g., an IEEE std. 802.11 access point, etc.) located within an acquisition range of the mobile device. With acquisition of signals transmitted by a sufficient number of wireless transmitters, a mobile device may, for example, infer or determine that its location is within a particular area of a larger indoor or like environment. A mobile device may then request or access smaller-sized positioning assistance data applicable to that particular area, such as via a suitable server, for example.

In some instances, a mobile device may travel within an indoor or like environment, such as within a multi-story shopping mall, for example, by frequently moving in and out of various areas (e.g., floors, wings, etc.) that may be respectively serviced by localized (e.g., smaller, etc.) segments of available positioning assistance data. Thus, at times, to obtain new positioning assistance data, it may be useful to detect or discover all or most in-range wireless transmitters of a newly-encountered area, for example. For this purpose, a mobile device may, for example, be "tempted" (e.g., configured, programmed, defaulted, etc.) to implement a passive scan. Unfortunately, repeated use of passive scans may consume significant battery or network resources, interrupt cellular or like communications, or the like, as was indicated. Accordingly, it may be desirable to develop one or more methods, systems, or apparatuses that may implement more effective or efficient indoor location or navigation techniques, such as by minimizing a number of passive scans via active measurements, for example, while increasing a number of detected wireless transmitters that may be used, in whole or in part, for localization.

Thus, as will be described in greater detail below, in an implementation, instead of initiating a passive scan, a mobile device may, for example, utilize one or more active measurements (e.g., RSSI, RTT, etc.), such as while probing one or more known wireless transmitters. For example, a mobile device may send an RTS to wireless transmitters identified to be within a presumed general area of the mobile device and whose observed or expected RSSI values are higher than some predetermined RSSI threshold, just to illustrate one possible implementation. If a number of probed wireless transmitters from which CTS responses are received is greater than some threshold number, a mobile device may, for example, infer that its location is within that presumed general area. If a number of probed wireless transmitters from which CTS responses are received is less than some threshold number, a mobile device may, for example, infer that its location is not or no longer within that presumed general area. In such a case, a mobile device may, among other things, initiate a passive scan, for example. As will be seen, at times, a mobile device may also trigger LCI detection in order to determine whether a location of the mobile device has changed (e.g., a user has changed floors, etc.). In some instances, such as if it is determined that a location of a mobile device has changed, for example, new positioning assistance data including an applicable radio heat map or a portion thereof, digital map, etc. may be downloaded and used, at least in part, for localization.

If CTS responses received from a number of probed wireless transmitters are greater than some threshold number, a mobile device may, for example, infer that its location is within that presumed general area. If CTS responses received from a number of probed wireless transmitters are less than some threshold number, a mobile device may, for example, infer that its location is not or no longer within that presumed general area. In such a case, a mobile device may, among other things, initiate a passive scan, for example, triggering LCI detection in order to determine whether a location of the mobile device has changed (e.g., a user has changed floors, etc.). If so, new positioning assistance data including, for example, an applicable radio heat map or a portion thereof, digital map, etc. may be downloaded and used, at least in part, for localization.

FIG. 1 is a schematic diagram illustrating features associated with an implementation of an example operating environment 100 capable of facilitating or supporting one or more processes or operations for detecting location changes and monitoring assistance data via scanning. As was indicated, operating environment 100 may be implemented in connection with one or more radio heat maps for an indoor or like environment that may be employed, in whole or in part, by a mobile device 102, for example. It should be appreciated that operating environment 100 is described herein as a non-limiting example that may be implemented, in whole or in part, in the context of various communications networks or combination of networks, such as public networks (e.g., the Internet, the World Wide Web), private networks (e.g., intranets), wireless local area networks (WLAN, etc.), or the like. It should also be noted that claimed subject matter is not limited to indoor implementations. For example, at times, one or more operations or techniques described herein may be performed, at least in part, in an indoor-like environment, which may include partially or substantially enclosed areas, such as urban canyons, town squares, amphitheaters, parking garages, rooftops, patios, or the like. At times, one or more operations or techniques described herein may be performed, at least in part, in an outdoor environment.

As illustrated, operating environment 100 may comprise, for example, one or more satellites 104, base transceiver stations 106, wireless transmitters 108, etc. capable of communicating with mobile device 102 via wireless communication links 110 in accordance with one or more communication protocols. Satellites 104 may be associated with one or more satellite positioning systems (SPS), such as, for example, the United States Global Positioning System (GPS), the Russian GLONASS system, the European Galileo system, as well as any system that may utilize satellites from a combination of satellite systems, or any satellite system developed in the future. Base transceiver stations 106, wireless transmitters 108, etc. may be of the same or similar type, for example, or may represent different types of devices, such as access points, radio beacons, cellular base stations, femtocells, or the like, depending on an implementation. At times, one or more wireless transmitters, such as wireless transmitters 108, for example, may be capable of transmitting as well as receiving wireless signals.

Although not shown, in some instances, operating environment 100 may, for example, include a relatively larger number of wireless transmitters 108 associated with an indoor or like area of interest. To illustrate, typically, although not necessarily, a larger number of wireless transmitters 108, such as access points, femtocells, etc., may, for example, correspond to or correlate with a more voluminous or comprehensive radio heat map. As was indicated, at times, this may lead to or result in having relatively large positioning assistance data, which may at least partially preclude position determination, location or navigation services, affect power consumption, etc. of mobile device 102. Of course, these are merely details relating to operating environment 100, and claimed subject matter is not so limited.

In some instances, one or more base transceiver stations 106, wireless transmitters 108, etc. may, for example, be operatively coupled to a network 112 that may comprise one or more wired or wireless communications or computing networks capable of providing suitable information, such as via one or more wireless communication links 114, 110, etc. As will be seen, information may include, for example, positioning assistance data, such as a radio heat map, digital map, LCI, identities or locations of one or more base transceiver stations 106, wireless transmitters 108, etc., recent position fix obtained via an SPS, probe request or response, or the like. In an implementation, network 112 may be capable of facilitating or supporting communications between suitable computing platforms or devices, such as, for example, mobile device 102, one or more base transceiver stations 106, wireless transmitters 108, as well as one or more servers associated with operating environment 100. In some instances, servers may include, for example, a location server 116, positioning assistance server 118, as well as one or more other servers, indicated generally at 120 (e.g., navigation, information, map, etc. server, etc.), capable of facilitating or supporting one or more operations or processes associated with operating environment 100.

As will be seen, location server 116 may provide a rough estimate of a location of mobile device 102, such as within an indoor or like area of interest, for example, associated with operating environment 100. A rough estimate of a location of mobile device 102 may, for example, be determined based, at least in part, on last or a recent position fix obtained via an SPS, input provided by an associated user (e.g., by typing an address, selecting a name, etc. of shopping mall, etc.), ranges measured to one or more known wireless transmitters, or the like. For example, at times, a rough estimate of a location of mobile device 102 may be determined using proximity to one or more reference points, such as by knowing which base transceiver station 106, wireless transmitter 108, etc. mobile device 102 is using at a given time. In addition, at times, location server 116 may provide an LCI for a particular indoor or like area of interest, such as in connection with an applicable digital map, for example. As was indicated, an LCI may comprise, for example, a locally defined area, such as a particular floor or wing of a building that is not mapped according to a global coordinate system. Thus, in some instances, such as at or upon entry of an indoor or like area of interest, for example, mobile device 102 may communicate a request to location server 116 to provide one or more LCIs covering an applicable interior area. Here, a request may reference a rough estimate of a location of mobile device 102, such that location server 116 may associate the rough location with an area identified by one or more LCIs, for example, and then communicate relevant LCIs to mobile device 102.

In some instances, mobile device 102 may utilize one or more received LCIs, in whole or in part, in subsequent messages with a suitable server, such as server 120, for example, to obtain navigation, map, or other information relevant to an area identified by one or more LCIs (e.g., a digital map, routing graph, etc.). Positioning assistance server 118 may, for example, provide positioning assistance data, such as locations or identities (e.g., MAC addresses, etc.) of wireless transmitters, a radio heat map covering an area identified via one or more LCIs, or the like. It should be noted that even though a certain number of computing platforms or devices are illustrated herein, any number of suitable computing platforms or devices may be implemented to facilitate or otherwise support one or more techniques or processes associated with operating environment 100. For example, at times, network 112 may be coupled to one or more wired or wireless communications networks (e.g., Wi-Fi, etc.) so as to enhance a coverage area for communications with mobile device 102, one or more base transceiver stations 106, wireless transmitters 108, servers 116, 118, 120, or the like. In some instances, network 112 may facilitate or support femtocell-based operative regions of coverage, for example. Again, these are merely example implementations, and claimed subject matter is not limited in this regard.

Figure 2:
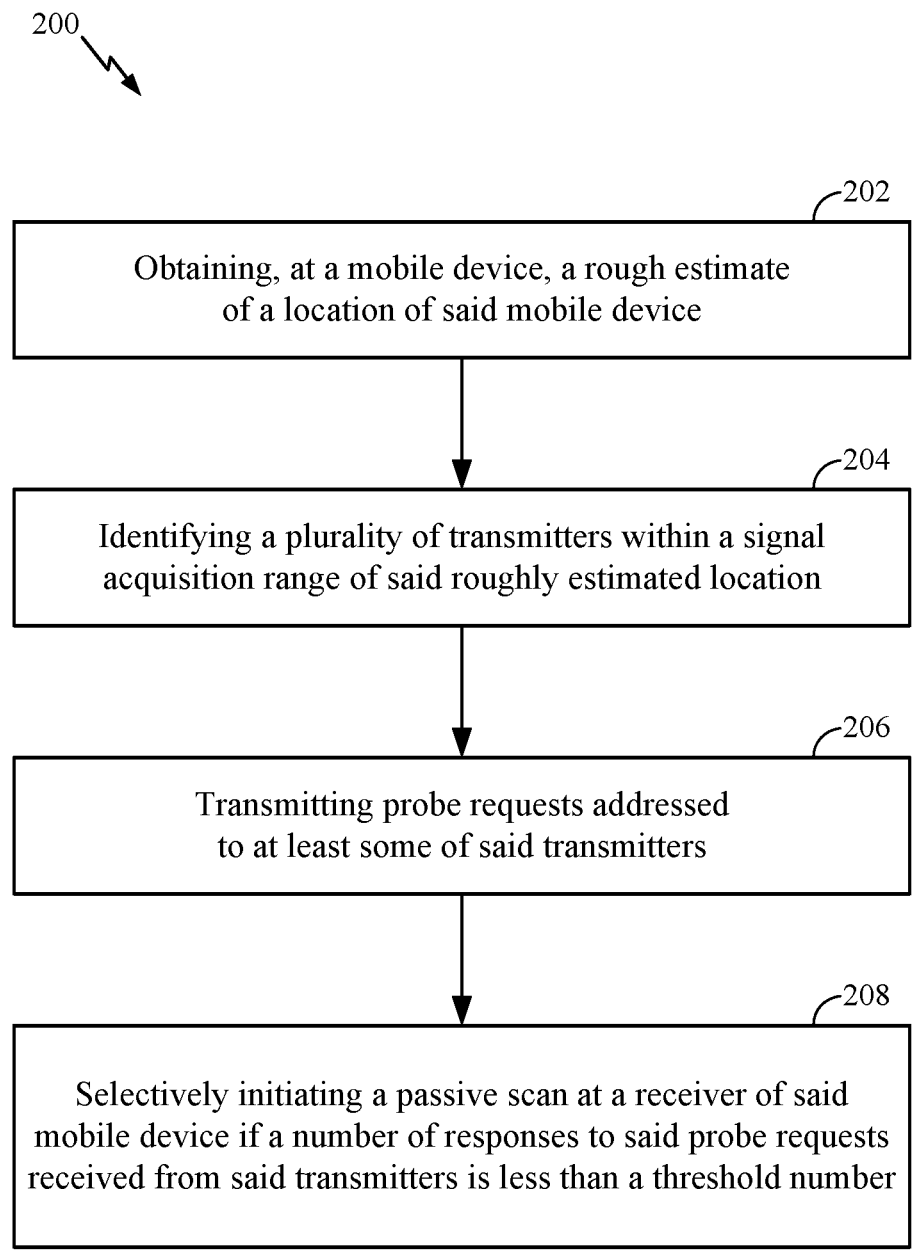
FIG. 2 is a flow diagram illustrating an implementation of an example process that may be performed to facilitate or support techniques for detecting location changes and monitoring assistance data via scanning.

With this in mind, attention is now drawn to FIG. 2, which is a flow diagram illustrating an implementation of an example process 200 that may be performed, in whole or in part, to facilitate or support one or more operations or techniques for detecting location changes and monitoring assistance data via scanning for use in or with a mobile device, such as mobile device 102 of FIG. 1, for example. It should be noted that information acquired or produced, such as, for example, input signals, output signals, operations, results, etc. associated with example process 200 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Example process 200 may, for example, begin at operation 202 with obtaining, at a mobile device, a rough estimate of a location of the mobile device. As was indicated, a rough estimate of a location of a mobile device may, for example, be obtained via a recent position fix obtained from an SPS, user input, proximity to one or more reference points, measured ranges to one or more wireless transmitters, or the like. At operation 204, a plurality of transmitters may, for example, be identified within a signal acquisition range of the roughly estimated location. For example, at times, a plurality of transmitters may be identified via a radio heat map covering an area of a rough location of a mobile device, via a previously performed Wi-Fi scan (e.g., passive, active, etc.), relevant LCI, cached routability graph, or the like. In some instances, one or more of a plurality of transmitters may comprise, for example, fixed location transmitters (e.g., one or more transmitters having a fixed reference point, etc.), just to illustrate another possible implementation.

With regard to operation 206, having identified a plurality of transmitters, a mobile device may, for example, transmit a number of probe requests (e.g., RTS, etc.) addressed to at least some of these transmitters. For example, in some instances, a mobile device may address probe requests to transmitters whose one or more expected signal characteristics (e.g., RSSI, RTT, etc.) exceed some predetermined threshold value. Here, one or more active measurements regarding these one or more expected signal characteristics, for example, may be utilized, at least in part, as previously discussed.

Figure 3:
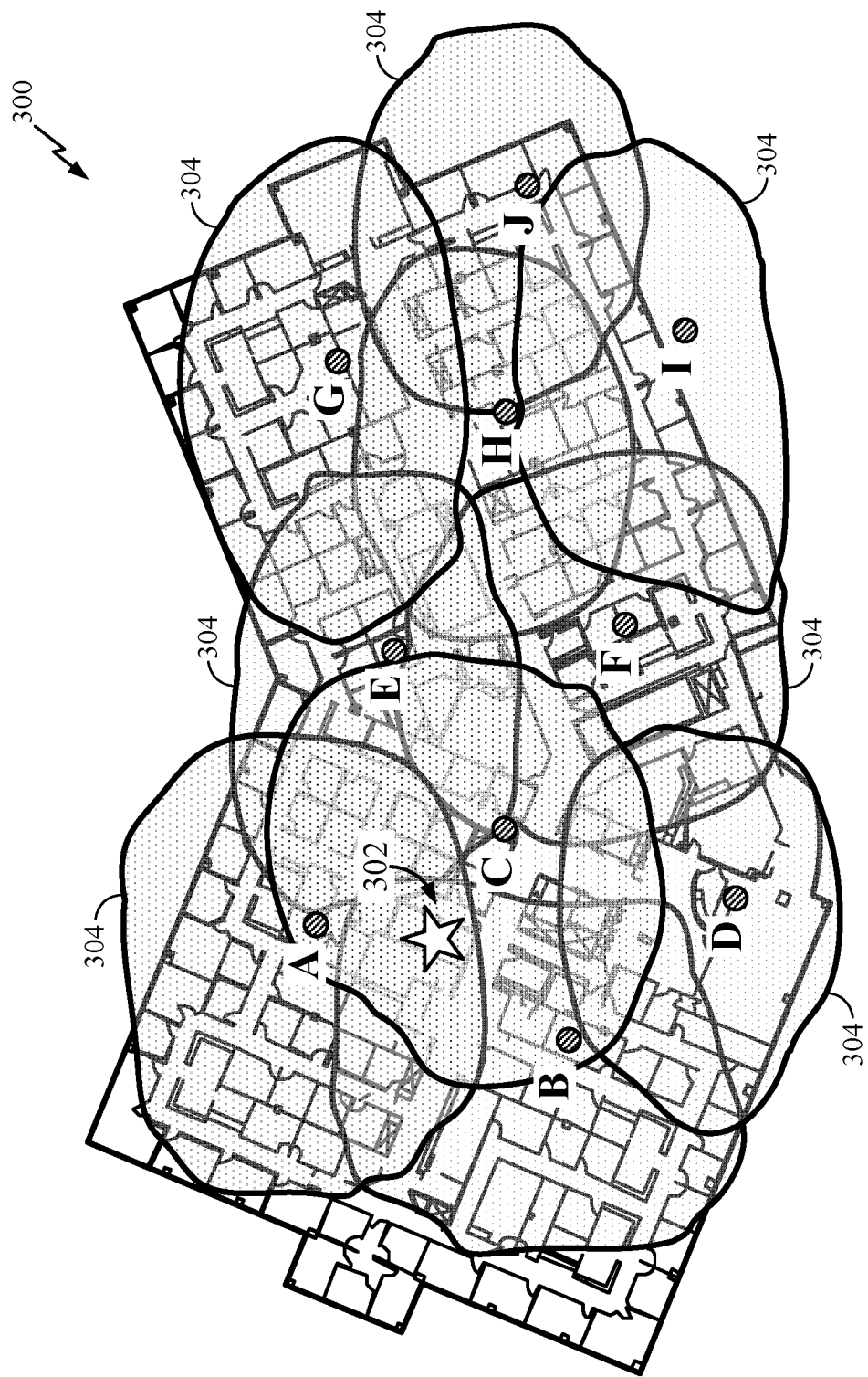
FIG. 3 is an illustration of an implementation of an example radio heat map covering an area of a rough location of a mobile device.

For example, as illustrated in FIG. 3, a number of proximate transmitters, referenced A through J, whose expected RSSI values exceed some predetermined threshold value may be selected, such as via a radio heat map 300 covering an area of a rough location 302 of a mobile device. Here, for purposes of illustration, each shaded area 304 may respectively correspond to or represent a radio signal distribution or range of interest of transmitters A-J, for example. As was indicated, in at least one implementation, a range of interest may comprise, for example, a range where expected RSSI values are higher than a certain predetermined RSSI threshold value. An RSSI threshold value may be determined, at least in part, experimentally and may be pre-defined or configured, for example, or otherwise dynamically defined in some manner, depending on a particular application, environment, transmitter, or the like. By way of example but not limitation, in one particular simulation or experiment, it appeared that an RSSI threshold value of about −90 dBm (minus 90 decibels of power with reference to one miliwatt) may prove beneficial in selecting known transmitters to be probed. Of course, details relating to a radio heat map or RSSI threshold value are merely examples to which claimed subject matter is not limited. For example, as was indicated, in some instances, such as if a plurality of known transmitters positioned within an area of interest exhibit relatively consistent processing delays, respective RTT measurements may be utilized, at least in part.

Thus, as illustrated in FIG. 3, at times, it may be determined that a mobile device is located within ranges of some transmitters whose expected RSSI values exceed a predetermined RSSI threshold value, such as transmitters A, B, and C, for example. Accordingly, here, a mobile device may, for example, transmit a number of probe requests addressed to these transmitters. As also illustrated, at times, ranges 304 of proximate transmitters, such as transmitters A through J, for example, may not be isotropic due, at least in part, to radio propagation or multipath effects (e.g., wall fading or shadowing, floor reflection, etc.) within an indoor or like environment covered by radio heat map 300. Of course, these are merely examples relating to transmitters or ranges, and claimed subject matter is not so limited.

Referring back to process 200 of FIG. 2, at operation 208, a passive scan may be selectively initiated, such as at a receiver of a mobile device, for example, if a number of responses to probe requests received from the transmitters (e.g., transmitters A, B, and C of FIG. 3, etc.) comprise less than a threshold number. For example, in certain simulations or experiments, it has been observed that if a location transmitter selected to be probed has not responded, a few particular or relevant events may have occurred. More specifically, non-responsiveness of a probed location transmitter may be indicative of an associated user changing floors, for example, in which case it may be useful to determine and provide a relevant LCI using one or more appropriate techniques.

Here, one or more LCI disambiguation (LCI-D) techniques may, for example, be employed, in whole or in part. For example, a mobile device or suitable server may disambiguate or distinguish between or among a number of candidate LCIs covering a rough location of the mobile device based, at least in part, on one or more wireless signals that the mobile device is receiving at a given time, just to illustrate one possible implementation. Thus, if a mobile device is receiving a wireless signal from a location transmitter associated with a particular LCI, for example, that LCI may be provided to the mobile device. If a mobile device is receiving wireless signals from a plurality of transmitters associated with multiple LCIs, at times, image features extracted from captured images corresponding to particular LCIs may, for example, be used, at least in part, to disambiguate between candidate LCIs. Of course, these are merely examples relating to LCI-D techniques, and claimed subject matter is not so limited.

In some instances, it has also been observed that non-responsiveness of a probed location transmitter may, for example, indicate that the transmitter may have been turned off, removed, or relocated to another area, in which case it may be useful to ignore the non-responsive transmitter. Also, at times, non-responsiveness of a location transmitter may be indicative of a change in radio propagation channels of an indoor or like environment, for example, which may require regeneration or reconstruction of applicable positioning assistance data. Thus, in some instances, probe requests implemented in connection with one or more active measurements may, for example, help to determine a particular reason for non-responsiveness of a probed location transmitter, which may provide benefits, as will be seen.

Continuing with the above discussion, if, upon performing active measurements with respect to selected transmitters within a particular area, for example, no response is received from N of them, where N is greater than a certain threshold number $N_0$, then it may be assumed that transmitter-related knowledge is insufficient for additional active measurements within that area. In such a case, it may be useful to initiate a passive scan, such as to determine a cause for non-responsiveness of transmitters, for example. Likewise, here, a threshold number $N_0$ may be determined, at least in part, experimentally and may be pre-defined or configured, for example, or otherwise dynamically defined in some manner, depending on a particular application, environment, transmitter, or the like.

In some instances, it may also be useful to implement one or more processes, such as in connection with a passive scan of operation 208, for example, to improve or enhance location determination of a mobile device, such as using one or more appropriate techniques. By way of example but not limitation, one or more processes that may be implemented, in whole or in part, in connection with a passive scan may include those listed below, though claimed subject matter is not so limited.

For example, here, a process implementing a detection of a new LCI may be triggered, such as using results of a passive scan to check whether a user of an associated mobile device has changed areas (e.g., floors, wings, etc.). If so, new or applicable positioning assistance data including a new LCI may, for example, be provided or downloaded to a mobile device. Detection of a new LCI may, for example, be performed via one or more LCI-D techniques, such as discussed above. At times, here, a single point fix process may, for example, be performed using one or more measurements obtained during a passive scan or one or more active measurements (e.g., subsequent, etc.). Depending on an implementation, measurements may comprise, for example, RSSI measurements, RTT measurements, or the like, as was indicated. Single point fix may, for example, be implemented using any suitable single point fix positioning solutions or techniques. Also, here, a suitable particle filter may, for example, be restarted, such as at or by a mobile device, suitable server, or any combination thereof. Particle filters are generally known and need not be described here in greater detail. In addition, here, a new set of in-range transmitters may, for example, be extracted or derived, such as via a suitable process, from positioning assistance data (e.g., a heat map, digital map, etc.) using a newly-estimated location, just to illustrate one possible implementation.

In some instances, such as if one or more newly-extracted or derived transmitters are non-responsive, here, an appropriate enterprise management system servicing these transmitters may, for example, be queried or contacted, such as via a suitable process, so as to determine whether these transmitters are in-service (e.g., turned off, etc.). If one or more non-responsive transmitters are not in service (e.g., turned off, etc.), for example, their respective positioning assistance data may be flagged in a suitable manner and may be ignored until the transmitters are put back in service (e.g., turned back on, etc.). Otherwise, it may be inferred, for example, that non-responsive transmitters have been removed, relocated to another area, etc. or that environmental dynamics have changed. In such a case, regeneration or reconstruction of positioning assistance data may, for example, be requested.

Continuing with the above example, if a number of non-responsive transmitters N is less than a certain threshold number $N_0$, for example, at times, a passive scan may not be needed or otherwise useful. Thus, a mobile device may report one or more non-responsive transmitters to a suitable server, such as for further monitoring, for example. A suitable server may collect or maintain a list of non-responsive transmitters, and may check status (e.g., periodically, etc.) of transmitters that are relatively frequently non-responsive, such as, for example, by contacting an enterprise management server, as was indicated. Optionally or alternatively, information of non-responsive transmitters (e.g., MAC addresses, locations, etc.) may be removed from positioning assistance data for a particular indoor or like area of interest.

Figure 4:
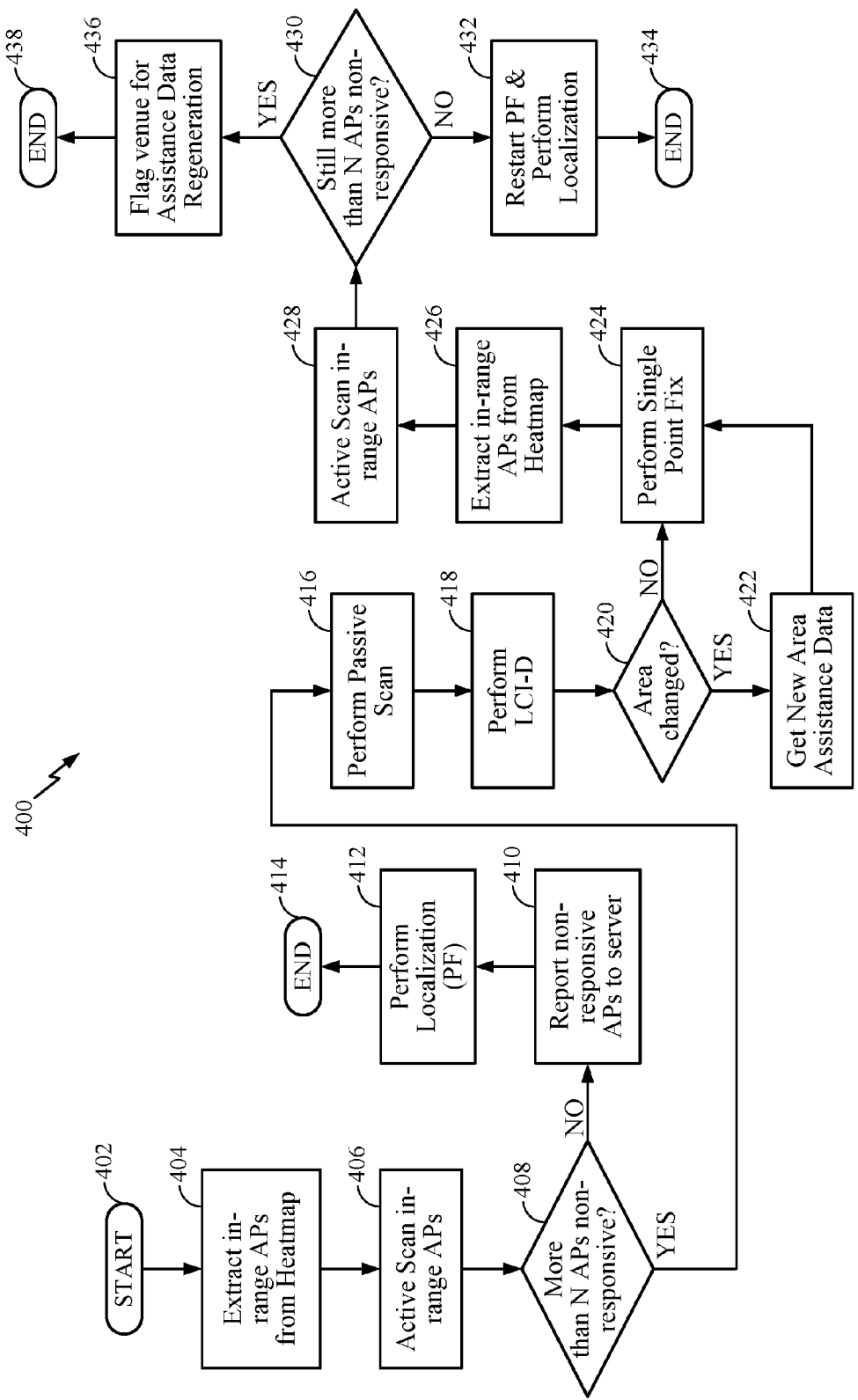
FIG. 4 is a flow diagram illustrating another implementation of an example process that may be performed to facilitate or support techniques for detecting location changes and monitoring assistance data via scanning.

FIG. 4 is a flow diagram illustrating an implementation of an example process 400 that may be performed, in whole or in part, to facilitate or support one or more operations or techniques for detecting location changes and monitoring assistance data via scanning of an area with a plurality of suitable wireless transmitters, such as IEEE std. 802.11 access points, for example. Again, here, information acquired or produced, such as, for example, input signals, output signals, operations, results, etc. associated with example process 400 may be represented via one or more digital signals. Likewise, even though one or more operations are illustrated or described concurrently or with respect to a certain sequence, other sequences or concurrent operations may be employed. Also, the description below may reference particular aspects or features illustrated in certain other figures, for example, and one or more operations may be performed with other aspects or features.

Example process 400 may, for example, start at operation 402, wherein a rough estimate of a location of a mobile device or any other suitable information (e.g., a digital map, routing graph, etc.) facilitating or supporting example process 400 may be requested or obtained. At operation 404, one or more in-range access points may be derived or extracted, such as from an applicable radio heat map, for example. As was indicated, here, one or more active measurements may, for example, be used, in whole or in part. For example, from an applicable radio heat map, a number of in-range access points whose expected RSSI is higher than a predetermined threshold may be selected, just to illustrate one possible implementation. With regard to operation 406, a number of selected in-range access points may be probed, such as via performing an active scan of an associated indoor or like area if interest, for example.

At operation 408, a determination may, for example, be made regarding a number of non-responsive access points, as was discussed. If it is determined that a number of non-responsive access points exceeds some predetermined threshold number, at operation 410, non-responsive access points may, for example, be reported to a suitable server (e.g., for further monitoring, etc.). With regard to operation 412, one or more localization processes may, for example, be implemented with respect to a mobile device of interest. In some instances, here, a particle filter may be employed, at least in part, as one possible example. As was also indicated, a list of non-responsive access points may be collected or maintained in some manner (e.g., on a suitable server, mobile device, etc.), for example, and their status may be checked or determined via contacting an appropriate enterprise management server. Information regarding one or more non-responsive access points may, for example, be removed from applicable positioning assistance data (e.g., a radio heat map, etc.), if desired. Having performed suitable localization, process 400 may, for example, be terminated in some manner, such as at operation 414.

On the other hand, if it is determined that a number of non-responsive access points is greater than a threshold number, example process 400 may, for example, proceed to operation 416, at which point a passive scan may be performed. As was discussed, in some instances, a passive scan may trigger LCI detection, such as using passive scan results, for example, and an LCI-D may be performed, as indicated at operation 418, so as to detect whether an area has changed (e.g., a user has changed floors, wings, etc.), such as using one or more techniques discussed above. At operation 420, if it is determined that an area has changed, new positioning assistance data, such as identified via one or more relevant LCIs, for example, may be provided to a mobile device, and a passive scan or single point fix may be subsequently performed, such as at operation 424. If an area has not changed, however, a passive scan or single point fix may be performed without obtaining new positioning assistance data, as illustrated via an arrow from operation 420 to operation 424.

With regard to operation 426, a number of in-range access points (e.g., a new set, etc.) may, for example, be extracted from an applicable radio heat map using a newly estimated (e.g., via relevant LCIs, etc.) location, such as similarly to operation 404, for example. Likewise, at operation 428, an active scan of in-range access points may, for example, be performed. If, at operation 430, it is determined that a number of non-responsive access points exceeding a threshold number still remains, example process 400 may proceed to operation 436, and an indoor or like environment (e.g., a venue, etc.) may be flagged, such as for positioning assistance data regeneration or reconstruction, as previously discussed. Subsequently, example process 400 may be terminated, such as at operation 438, for example. If, on the other hand, it is determined that a number of non-responsive access points is less than a threshold number, at operation 432, a suitable localization operation may, for example, be performed, such as via restarting a particle filter or the like. Here, having obtained a position fix of a mobile device, at times, updated positioning assistance data may, for example, be requested or obtained so as to improve or enhance an indoor location of the device (e.g., in a new area, etc.). As illustrated, example process 400 may, for example, be terminated at operation 434 in any suitable manner.

Accordingly, as discussed herein, one or more operations or techniques for detecting location changes and monitoring assistance data via scanning may provide benefits. For example, non-responsiveness of one or more in-range wireless transmitters may be meaningfully analyzed so as to determine whether a location of a mobile device in an area identifiable via one or more LCIs has changed (e.g., if an associated user has traveled to another floor, wing, etc.). It may also allow for more effective or efficient determination of whether one or more in-range wireless transmitters may be relied upon for sufficient localization, such as, for example, by inferring whether transmitters have been turned off, taken out of service, moved or relocated to another area, or the like. Also, knowledge with respect to changes in environmental dynamics within an indoor or like area of interest may be advantageous, since it may provide insights on whether or when it may be necessary or useful to regenerate or reconstruct applicable positioning assistance data, for example.

Another benefit may be that one or more non-responsive in-range wireless transmitters may be sufficiently evaluated with a minimal or otherwise reduced utilization of passive scans, for example, such as if certain discrepancies are observed in response to one or more active scans. This may improve power consumption, memory, operating lifetime, or overall utility of a mobile device, as was indicated. Also, relatively fast discovery or detection of an area or LCI change may, for example, positively affect associated user experience, location or navigation services, or the like. Monitoring or promptly removing one or more non-responsive in-range wireless transmitters, timely updates of positioning assistance data, such as if changes in an environment are detected, for example, may also prove beneficial in keeping a suitable localization process or engine more accurate or reliable. Of course, such a description of certain aspects of one or more operations or techniques for detecting location changes and monitoring assistance data via scanning and its benefits is merely an example, and claimed subject matter is not so limited.

Figure 5:
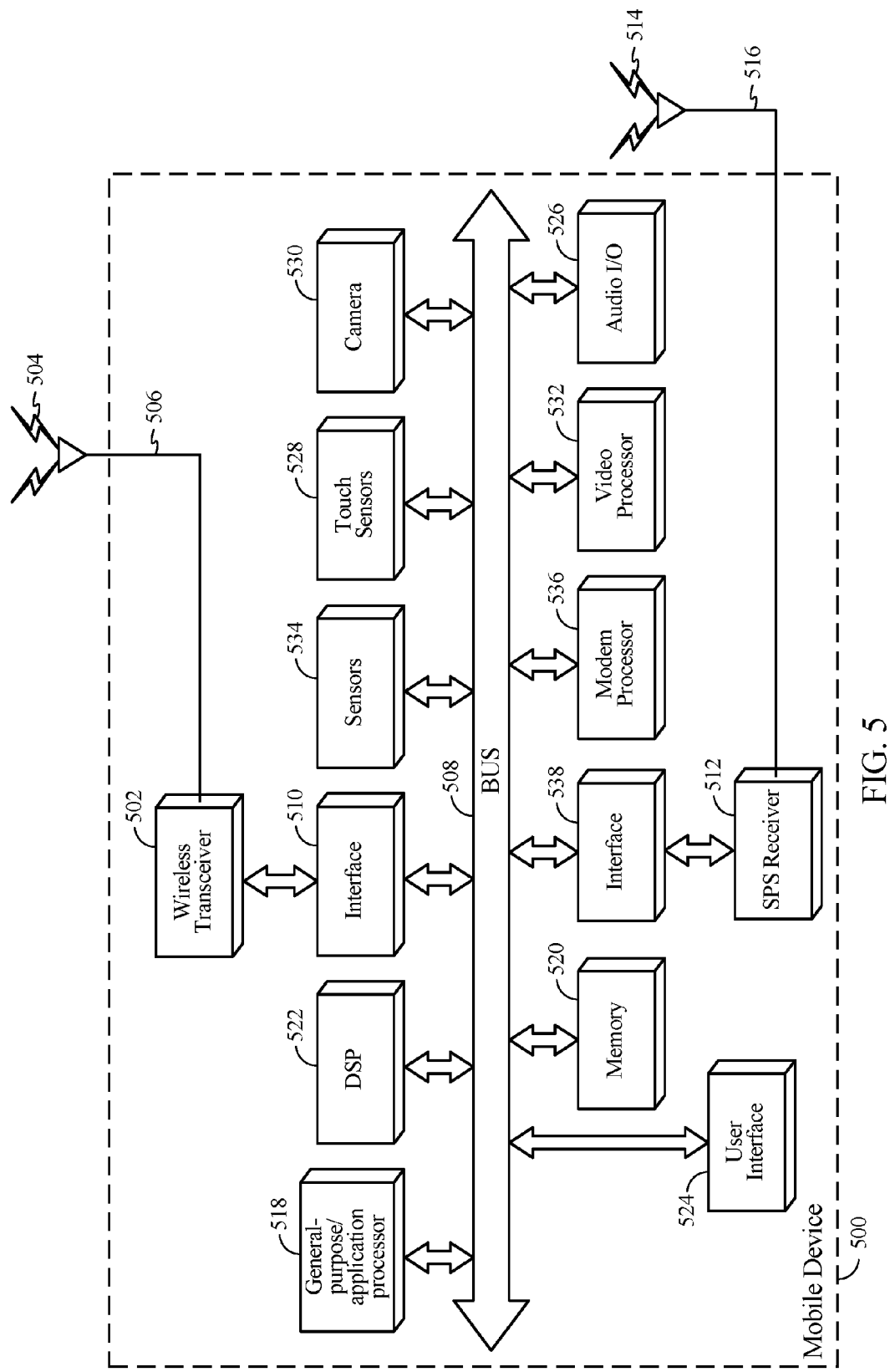
FIG. 5 is a schematic diagram illustrating an implementation of an example computing environment associated with a mobile device.

FIG. 5 is a schematic diagram of an implementation of an example computing environment associated with a mobile device that may be used, at least in part, to facilitate or support one or more operations or techniques for detecting location changes and monitoring assistance data via scanning, such as for more effective or efficient positioning in an indoor or like environment. An example computing environment may comprise, for example, a mobile device 500 that may include one or more features or aspects of mobile device 102 of FIG. 1, though claimed subject matter is not so limited. For example, in some instances, mobile device 500 may comprise a wireless transceiver 502 capable of transmitting or receiving wireless signals, referenced generally at 504, such as via an antenna 506 over a suitable wireless communications network. Wireless transceiver 502 may, for example, be coupled or connected to a bus 508 via a wireless transceiver bus interface 510. Depending on an implementation, at times, wireless transceiver bus interface 510 may, for example, be at least partially integrated with wireless transceiver 502. Some implementations may include multiple wireless transceivers 502 or antennas 506 so as to enable transmitting or receiving signals according to a corresponding multiple wireless communication standards such as Wireless Fidelity (WiFi), Code Division Multiple Access (CDMA), Wideband-CDMA (W-CDMA), Long Term Evolution (LTE), Bluetooth®, just to name a few examples.

In an implementation, mobile device 500 may, for example, comprise an SPS or like receiver 512 capable of receiving or acquiring one or more SPS or other suitable wireless signals 514, such as via an SPS or like antenna 516. SPS receiver 512 may process, in whole or in part, one or more acquired SPS signals 514 for estimating a location, rough or otherwise, of mobile device 500. In some instances, one or more general-purpose application processors 518, memory 520, digital signal processor(s) (DSP) 522, or like specialized devices or processors not shown may be utilized to process acquired SPS signals 514, in whole or in part, calculate a location of mobile device 500, such as in conjunction with SPS receiver 512, or the like. Storage of SPS or other signals for implementing one or more positioning operations, such as in connection with one or more techniques for detecting location changes and monitoring assistance data via scanning, for example, may be performed, at least in part, in memory 520, suitable registers or buffers (not shown). Although not shown, it should be appreciated that in at least one implementation one or more processors 518, memory 520, DSPs 522, or like specialized devices or processors may comprise one or more processing modules capable of obtaining a rough estimate of a location of a mobile device; identifying a plurality of transmitters within a signal acquisition range of the roughly estimated location; transmitting probe requests addressed to at least some of the transmitters; and selectively initiating a passive scan at a receiver of the mobile device if responses to the probe requests received from a number of the transmitters comprise less than a threshold number. It should also be noted that all or part of one or more processing modules may be implemented using or otherwise including hardware, firmware, software, or any combination thereof.

As illustrated, DSP 522 may be coupled or connected to processor 518 and memory 520 via bus 508. Although not shown, in some instances, bus 508 may comprise one or more bus interfaces that may be integrated with one or more applicable components of mobile device 500, such as DSP 522, processor 518, memory 520, or the like. In various embodiments, one or more operations or functions described herein may be performed in response to execution of one or more machine-readable instructions stored in memory 520, such as on a computer-readable storage medium, such as RAM, ROM, FLASH, disc drive, etc., just to name a few examples. Instructions may, for example, be executable via processor 518, one or more specialized processors not shown, DSP 522, or the like. Memory 520 may comprise a non-transitory processor-readable memory, computer-readable memory, etc. that may store software code (e.g., programming code, instructions, etc.) that may be executable by processor 518, DSP 522, or the like to perform operations or functions described herein.

Mobile device 500 may comprise a user interface 524, which may include any one of several devices such as, for example, a speaker, microphone, display device, vibration device, keyboard, touch screen, etc., just to name a few examples. In at least one implementation, user interface 524 may enable a user to interact with one or more applications hosted on mobile device 500. For example, one or more devices of user interface 524 may store analog or digital signals on memory 520 to be further processed by DSP 522, processor 518, etc. in response to input or action from a user. Similarly, one or more applications hosted on mobile device 500 may store analog or digital signals in memory 520 to present an output signal to a user. In some implementations, mobile device 500 may optionally include a dedicated audio input/output (I/O) device 526 comprising, for example, a dedicated speaker, microphone, digital to analog circuitry, analog to digital circuitry, amplifiers, gain control, or the like. It should be understood, however, that this is merely an example of how audio I/O device 526 may be implemented, and that claimed subject matter is not limited in this respect. As seen, mobile device 500 may comprise one or more touch sensors 528 responsive to touching or like pressure applied on a keyboard, touch screen, or the like.

In an implementation, mobile device 500 may comprise, for example, a camera 530, dedicated or otherwise, such as for capturing still or moving imagery, facilitating one or more LCI-D techniques, or the like. Camera 530 may comprise, for example, a camera sensor or like imaging device (e.g., charge coupled device, complementary metal oxide semiconductor (CMOS)-type imager, etc.), lens, analog to digital circuitry, frame buffers, etc., just to name a few examples. In some instances, additional processing, conditioning, encoding, or compression of signals representing one or more captured images may, for example, be performed, at least in part, at processor 518, DSP 522, or the like. Optionally or alternatively, a video processor 532, dedicated or otherwise, may perform conditioning, encoding, compression, or manipulation of signals representing one or more captured images. Additionally, video processor 532 may, for example, decode or decompress one or more stored images for presentation on a display (not shown) of mobile device 500.

Mobile device 500 may comprise one or more sensors 534 coupled or connected to bus 508, such as, for example, one or more inertial sensors, ambient environment sensors, or the like. Inertial sensors of sensors 534 may comprise, for example, one or more accelerometers (e.g., collectively responding to acceleration of mobile device 500 in one, two, or three dimensions, etc.), gyroscopes or magnetometers (e.g., to support one or more compass or like applications, etc.), etc., just to illustrate a few examples. Ambient environment sensors of mobile device 500 may comprise, for example, one or more temperature sensors, barometric pressure sensors, ambient light detectors, camera sensors, microphones, etc., just to name few examples. Sensors 534 may generate analog or digital signals that may be stored in memory 520 and may be processed by DSP 522, processor 518, etc., such as in support of one or more applications directed to positioning or navigation operations, communications, gaming or the like.

In a particular implementation, mobile device 500 may comprise a modem processor 536, dedicated or otherwise, capable of performing baseband processing of signals received or downconverted via wireless transceiver 502, SPS receiver 512, or the like. Similarly, modem processor 536 may perform baseband processing of signals to be upconverted for transmission via wireless transceiver 502, for example. In alternative implementations, instead of having a dedicated modem processor, baseband processing may be performed, at least in part, by processor 518, DSP 522, or the like. In addition, in some instances, an interface 538, although illustrated as a separate component, may be integrated, in whole or in part, with one or more applicable components of mobile device 500, such as bus 508 or SPS receiver 512, for example. Optionally or alternatively, SPS receiver 512 may be coupled or connected to bus 508 directly. It should be understood, however, that these are merely examples of components or structures that may perform baseband processing, and that claimed subject matter is not limited in this regard.

Figure 6:
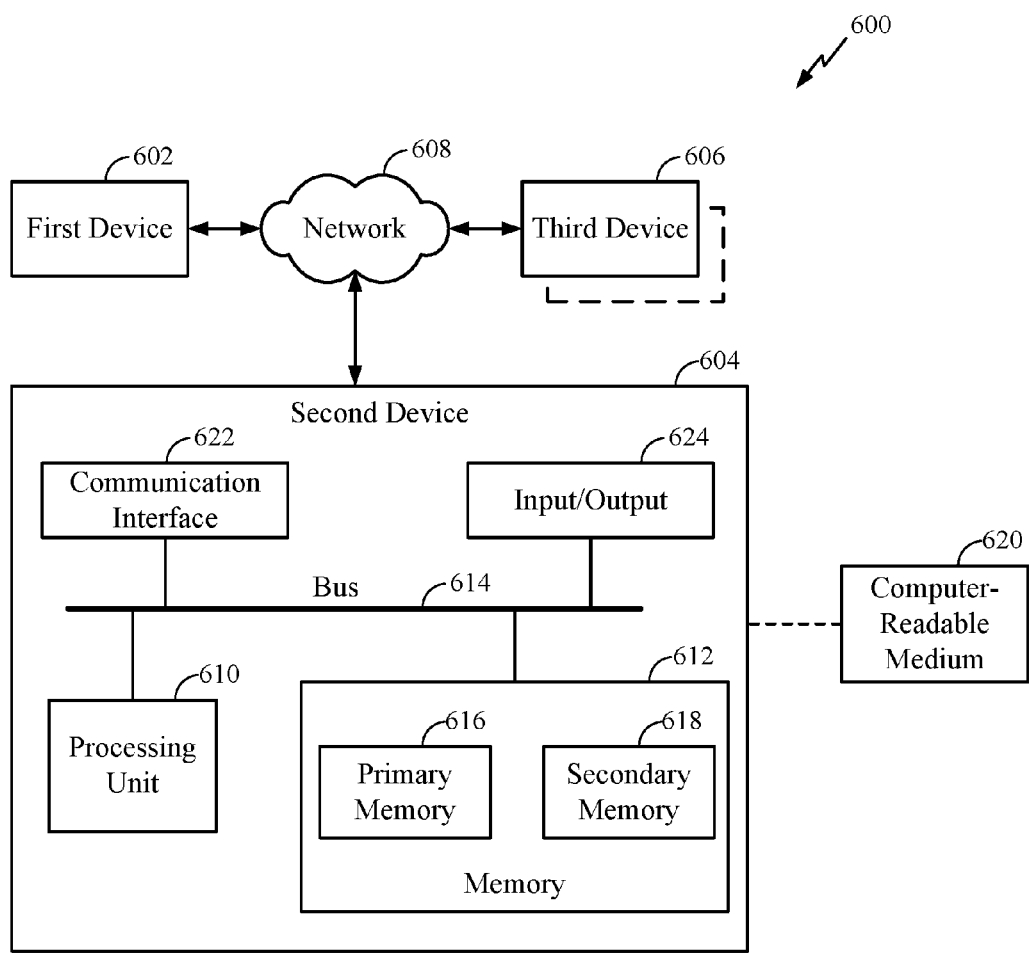
FIG. 6 is a schematic diagram illustrating an implementation of an example computing environment associated with a server.

FIG. 6 is a schematic diagram illustrating an implementation of an example computing environment or system 600 that may be associated with or include one or more servers or other devices capable of partially or substantially implementing or supporting one or more operations or techniques for detecting location changes and monitoring assistance data via scanning, such as for more effective or efficient positioning in an indoor or like environment, such as discussed above in connection with FIG. 1, for example. Computing environment 600 may include, for example, a first device 602, a second device 604, a third device 606, etc., which may be operatively coupled together via a communications network 608. In some instances, first device 602 may comprise a server capable of providing positioning assistance data, such as, for example, identities or locations of known wireless transmitters, radio heat map, probe request or response, base station almanac, digital map, LCI, or the like. For example, first device 602 may also comprise a server capable of providing an LCI to a requesting mobile device based, at least in part, on a rough estimate of a location of the mobile device. First device 602 may also comprise a server capable of providing indoor positioning assistance data relevant to a location of an LCI specified in a request from a mobile device. Second device 604 or third device 606 may comprise, for example, mobile devices, just to illustrate one possible implementation. In addition, communications network 608 may comprise one or more wireless transmitters, such as access points, femtocells, or the like. Of course, claimed subject matter is not limited in scope in these respects.

First device 602, second device 604, or third device 606 may be representative of any device, appliance, platform, or machine that may be capable of exchanging information over communications network 608. By way of example but not limitation, any of first device 602, second device 604, or third device 606 may include: one or more computing devices or platforms, such as, for example, a desktop computer, a laptop computer, a workstation, a server device, or the like; one or more personal computing or communication devices or appliances, such as, for example, a personal digital assistant, mobile communication device, or the like; a computing system or associated service provider capability, such as, for example, a database or information storage service provider/system, a network service provider/system, an Internet or intranet service provider/system, a portal or search engine service provider/system, a wireless communication service provider/system; or any combination thereof. Any of first, second, or third devices 602, 604, and 606, respectively, may comprise one or more of a mobile device, wireless transmitter or receiver, server, etc. in accordance with example implementations described herein.

In an implementation, communications network 608 may be representative of one or more communication links, processes, or resources capable of supporting an exchange of information between at least two of first device 602, second device 604, or third device 606. By way of example but not limitation, communications network 608 may include wireless or wired communication links, telephone or telecommunications systems, information buses or channels, optical fibers, terrestrial or space vehicle resources, local area networks, wide area networks, intranets, the Internet, routers or switches, and the like, or any combination thereof. As illustrated, for example, via a dashed lined box partially obscured by third device 606, there may be additional like devices operatively coupled to communications network 608. It is also recognized that all or part of various devices or networks shown in computing environment 600, or processes or methods, as described herein, may be implemented using or otherwise including hardware, firmware, software, or any combination thereof.

By way of example but not limitation, second device 604 may include at least one processing unit 610 that may be operatively coupled to a memory 612 via a bus 614. Processing unit 610 may be representative of one or more circuits capable of performing at least a portion of a suitable computing procedure or process. For example, processing unit 610 may include one or more processors, controllers, microprocessors, microcontrollers, application specific integrated circuits, digital signal processors, programmable logic devices, field programmable gate arrays, or the like, or any combination thereof.

Memory 612 may be representative of any information storage mechanism or appliance. Memory 612 may include, for example, a primary memory 616 and a secondary memory 618. Primary memory 616 may include, for example, a random access memory, read only memory, etc. While illustrated in this example as being separate from processing unit 610, it should be understood that all or part of primary memory 616 may be provided within or otherwise co-located/coupled with processing unit 610. Secondary memory 618 may include, for example, same or similar type of memory as primary memory or one or more information storage devices or systems, such as, for example, a disk drive, an optical disc drive, a tape drive, a solid state memory drive, etc. In certain implementations, secondary memory 618 may be operatively receptive of, or otherwise configurable to couple to, a computer-readable medium 620. Computer-readable medium 620 may include, for example, any non-transitory storage medium that may carry or make accessible information, code, or instructions for one or more of devices in computing environment 600. Computer-readable medium 620 may also be referred to as a storage medium.

Second device 604 may include, for example, a communication interface 622 that may provide for or otherwise support an operative coupling of second device 604 to at least communications network 608. By way of example but not limitation, communication interface 622 may include a network interface device or card, a modem, a router, a switch, a transceiver, and the like. Second device 604 may also include, for example, an input/output device 624. Input/output device 624 may be representative of one or more devices or features that may be configurable to accept or otherwise introduce human or machine inputs, or one or more devices or features that may be capable of delivering or otherwise providing for human or machine outputs. By way of example but not limitation, input/output device 624 may include an operatively configured display, speaker, keyboard, mouse, trackball, touch screen, information port, or the like.

Methodologies described herein may be implemented by various means depending upon applications according to particular features or examples. For example, methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, methodologies may be implemented with modules (e.g., procedures, functions, etc.) having instructions that perform functions described herein. Any computer-readable medium tangibly embodying instructions may be used in implementing methodologies described herein. For example, software codes may be stored in a memory and executed by a processor. Memory may be implemented within the processor or external to the processor. As used herein the term "memory" may refer to any type of long term, short term, volatile, non-volatile, or other memory and is not to be limited to any particular type of memory or number of memories, or type of media upon which memory is stored. In at least some implementations, one or more portions of the herein described storage media may store signals representative of information as expressed by a particular state of the storage media. For example, an electronic signal representative of information may be "stored" in a portion of the storage media (e.g., memory) by affecting or changing the state of such portions of the storage media to represent information as binary information (e.g., via ones and zeros). As such, in a particular implementation, such a change of state of the portion of the storage media to store a signal representative of information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to store desired program code in the form of instructions or information structures and that may be accessed by a computer or processor thereof. Disk and disc, as used herein, includes compact disc (CD), laser disc, optical disc, digital versatile disc (DVD), floppy disk and blue-ray disc where disks usually reproduce information magnetically, while discs reproduce information optically with lasers.

As discussed above, a mobile device may be capable of communicating with one or more other devices via wireless transmission or receipt of information over various communications networks using one or more wireless communication techniques. Here, for example, wireless communication techniques may be implemented using a wireless wide area network (WWAN), a wireless local area network (WLAN), a wireless personal area network (WPAN), or the like. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rdGeneration Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, or some other type of network, for example. The techniques may also be implemented in conjunction with any combination of WWAN, WLAN, or WPAN. Wireless communication networks may include so-called next generation technologies (e.g., "4G"), such as, for example, Long Term Evolution (LTE), Advanced LTE, WiMAX, Ultra Mobile Broadband (UMB), or the like.

In an implementation, a mobile device may, for example, be capable of communicating with one or more femtocells, such as for the purpose of estimating its location, obtaining positioning assistance data, extending cellular telephone service into a business or home, or the like. As used herein, "femtocell" may refer to one or more smaller-size cellular base stations that may be capable of detecting a wireless signal transmitted from a mobile device using one or more appropriate techniques. Typically, although not necessarily, a femtocell may utilize or otherwise be compatible with various types of communication technology such as, for example, Universal Mobile Telecommunications System (UTMS), Long Term Evolution (LTE), Evolution-Data Optimized or Evolution-Data only (EV-DO), GSM, Worldwide Interoperability for Microwave Access (WiMAX), Code division multiple access (CDMA)-2000, or Time Division Synchronous Code Division Multiple Access (TD-SCDMA), to name just a few examples among many possible. In certain implementations, a femtocell may comprise integrated WiFi, for example, and may provide a mobile device access to a larger cellular telecommunication network by way of another broadband network, such as the Internet. However, such details relating to femtocells are merely examples, and claimed subject matter is not so limited.

Techniques described herein may be used with an SPS that includes any one of several GNSS or combinations of GNSS. Furthermore, techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal, etc.). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "space vehicle" (SV), as used herein, is intended to include terrestrial transmitters acting as pseudolites, equivalents of pseudolites, and possibly others. The terms "SPS signals" or "SV signals", as used herein, is intended to include SPS-like signals from terrestrial transmitters, including terrestrial transmitters acting as pseudolites or equivalents of pseudolites.

Also, computer-readable code or instructions may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A method comprising:
   obtaining, at a mobile device, a rough estimate of a location of said mobile device;
   identifying a first plurality of transmitters within a first signal acquisition range of said mobile device based, at least in part, on positioning assistance data obtained for said location;
   transmitting probe requests addressed to at least some of said first plurality of transmitters;
   selectively initiating a passive scan at a receiver of said mobile device if a number of responses to said probe requests received from said at least some of said first plurality of transmitters is less than a threshold number;
   determining whether said location of said mobile device has changed; and
   obtaining new positioning assistance data based, at least in part, on said determination.

2. The method of claim 1, and further comprising:
   identifying a second plurality of transmitters within a second signal acquisition range of said mobile device based, at least in part, on said new positioning assistance data for said changed location.

3. The method of claim 2, and further comprising:
   transmitting additional probe requests addressed to at least some of said second plurality of transmitters; and
   flagging a venue associated with said changed location for regeneration or reconstruction of positioning assistance data for said venue if a number of responses to said additional probe requests received from said at least some of said second plurality of transmitters is less than a threshold number.

4. The method of claim 2, wherein said second plurality of transmitters includes one or more of said first plurality of transmitters.

5. The method of claim 2, wherein one or more of said first plurality of transmitters and said second plurality of transmitters is associated with an indoor environment.

6. The method of claim 1, wherein said determining whether said location of said mobile device has changed is based, at least in part, on performing at least one location context identifier (LCI) disambiguation operation.

7. The method of claim 6, wherein said at least one LCI disambiguation operation is implemented to distinguish between a plurality of candidate LCIs covering said rough estimate of said location of said mobile device.

8. The method of claim 7, wherein said plurality of candidate LCIs comprise at least one of the following: a plurality of different floors of a building; a plurality of different portions of a building; or any combination thereof.

9. The method of claim 6, wherein said at least one LCI disambiguation operation is based, at least in part, on one or more wireless signals received by said mobile device in connection with said passive scan.

10. The method of claim 6, wherein said at least one LCI disambiguation operation is based, at least in part, on one or more image features extracted from captured images corresponding to particular LCIs of a plurality of candidate LCIs covering said rough estimate of said location of said mobile device.

11. The method of claim 1, wherein said at least some of said first plurality of transmitters comprise transmitters whose one or more expected signal characteristics exceed a predetermined threshold value, said one or more expected signal characteristics comprising at least one of the following: a received signal strength-type characteristic; a round-trip delay time-type characteristic; or any combination thereof.

12. The method of claim 1, and further comprising obtaining a position fix of said mobile device based, at least in part, on said new positioning assistance data.

13. The method of claim 1, wherein said new positioning assistance comprise at least one of the following: an LCI for said changed location; a radio heat map for said changed location; an electronic digital map for said changed location; identities of a second plurality of transmitters; locations of a second plurality of transmitters; a routing graph for said changed location; or any combination thereof.

14. An apparatus comprising:
means for obtaining, at a mobile device, a rough estimate of a location of said mobile device;
means for identifying a first plurality of transmitters within a first signal acquisition range of said mobile device based, at least in part, on positioning assistance data obtained for said location;
means for transmitting probe requests addressed to at least some of said first plurality of transmitters;
means for selectively initiating a passive scan at a receiver of said mobile device if a number of responses to said probe requests received from said at least some of said first plurality of transmitters is less than a threshold number;
means for determining whether said location of said mobile device has changed; and
means for obtaining new positioning assistance data based, at least in part, on said determination.

15. The apparatus of claim 14, and further comprising:
means for identifying a second plurality of transmitters within a second signal acquisition range of said mobile device based, at least in part, on said new positioning assistance data for said changed location.

16. The apparatus of claim 15, and further comprising:
means for transmitting additional probe requests addressed to at least some of said second plurality of transmitters; and
means for flagging a venue associated with said changed location for regeneration or reconstruction of positioning assistance data for said venue if a number of responses to said additional probe requests received from said at least some of said second plurality of transmitters is less than a threshold number.

17. The apparatus of claim 14, wherein said means for determining whether said location of said mobile device has changed further comprises means for performing at least one location context identifier (LCI) disambiguation operation.

18. An apparatus comprising:
a wireless transceiver to communicate with an electronic communications network to:
obtain, at a mobile device, a rough estimate of a location of said mobile device; and
one or more processors coupled to a memory, said one or more processors and said memory configured to:
identify a first plurality of transmitters within a first signal acquisition range of said mobile device based, at least in part, on positioning assistance data obtained for said location;
wherein said wireless transceiver further configured to:
transmit probe requests addressed to at least some of said first plurality of transmitters; and
wherein said one or more processors and said memory further configured to:
selectively initiate a passive scan at a receiver of said mobile device if a number of responses to said probe requests received from said at least some of said first plurality of transmitters is less than a threshold number;
determine whether said location of said mobile device has changed; and
wherein said wireless transceiver further configured to obtain new positioning assistance data based, at least in part, on said determination.

19. The apparatus of claim 18, wherein said one or more processors coupled to said memory further configured to:
identify a second plurality of transmitters within a second signal acquisition range of said mobile device based, at least in part, on said new positioning assistance data for said changed location.

20. The apparatus of claim 19, wherein said wireless transceiver further configured to:
transmit additional probe requests addressed to at least some of said second plurality of transmitters; and
wherein said one or more processors and said memory further configured to:
flag a venue associated with said changed location for regeneration or reconstruction of positioning assistance data for said venue if a number of responses to said additional probe requests received from said at least some of said second plurality of transmitters is less than a threshold number.

21. The apparatus of claim 18, wherein said one or more processors and said memory further configured to:
determine whether said location of said mobile device has changed based, at least in part, on performing at least one location context identifier (LCI) disambiguation operation.

22. The apparatus of claim 21, wherein said at least one LCI disambiguation operation is implemented to distinguish between a plurality of candidate LCIs covering said rough estimate of said location of said mobile device.

23. The apparatus of claim 22, wherein said plurality of candidate LCIs comprise at least one of the following: a plurality of different floors of a building; a plurality of different portions of a building; or any combination thereof.

24. The apparatus of claim 21, wherein said at least one LCI disambiguation operation is based, at least in part, on one or more image features extracted from captured images corresponding to particular LCIs of a plurality of candidate LCIs covering said rough estimate of said location of said mobile device.

25. The apparatus of claim 21, wherein said at least one LCI disambiguation operation is based, at least in part, on one or more wireless signals received by said mobile device in connection with said passive scan.

26. The apparatus of claim 18, wherein said at least some of said first plurality of transmitters comprise transmitters whose one or more expected signal characteristics exceed a predetermined threshold value.

27. The apparatus of claim 18, wherein said new positioning assistance comprise at least one of the following: an LCI for said changed location; a radio heat map for said changed location; an electronic digital map for said changed location; identities of a second plurality of transmitters; locations of a second plurality of transmitters; a routing graph for said changed location; or any combination thereof.

28. A non-transitory storage medium having instructions executable by a processor to:
obtain, at a mobile device, a rough estimate of a location of said mobile device;
identify a first plurality of transmitters within a first signal acquisition range of said mobile device based, at least in part, on positioning assistance data obtained for said location;
transmit probe requests addressed to at least some of said first plurality of transmitters;
selectively initiate a passive scan at a receiver of said mobile device if a number of responses to said probe requests received from said at least some of said first plurality of transmitters is less than a threshold number;
determine whether said location of said mobile device has changed; and
obtain new positioning assistance data based, at least in part, on said determination.

29. The non-transitory storage medium of claim 28, wherein said instructions further comprise instructions to:
   identify a second plurality of transmitters within a second signal acquisition range of said mobile device based, at least in part, on said new positioning assistance data for said changed location.

30. The non-transitory storage medium of claim 28, wherein said instructions further comprise instructions to:
   transmit additional probe requests addressed to at least some of said second plurality of transmitters; and
   flag a venue associated with said changed location for regeneration or reconstruction of positioning assistance data for said venue if a number of responses to said additional probe requests received from said at least some of said second plurality of transmitters is less than a threshold number.

\* \* \* \* \*